United States Patent [19]
Simms et al.

[11] 3,759,914
[45] Sept. 18, 1973

[54] IMPROVED CURING COMPOSITIONS FOR EPOXY RESINS COMPRISING LATENT AMINE CURING AGENT AND ACCELERATOR

[75] Inventors: John A. Simms; Henry S. Tremper, III, both of Wilmington, Del.

[73] Assignee: E. I. du Pont de Nemours and Company, Wilmington, Del.

[22] Filed: Aug. 10, 1971

[21] Appl. No.: 170,623

[52] U.S. Cl........ 260/37 EP, 117/161 ZB, 161/184, 260/2 N, 260/18 PF, 260/30.4 EP, 260/31.4 EP, 260/32.6 R, 260/32.8 EP, 260/33.6 EP, 260/47 EN, 260/59, 260/78.4 EP, 260/79, 260/80.3 R, 260/88.3 A, 260/91.3 VA, 260/830 R, 260/830 TN, 260/836, 260/837 PV
[51] Int. Cl........................ C08g 30/14, C08g 51/04
[58] Field of Search ................. 260/47 EN, 2 N, 59, 260/18 EP, 78.4 EP, 88.3 A, 37 EP, 77.5 AB, 77.5 AM

[56] References Cited
UNITED STATES PATENTS
3,386,956  6/1968  Nawakowski et al................. 260/47

Primary Examiner—Harold D. Anderson
Assistant Examiner—T. Pertilla
Attorney—David J. Gould

[57] ABSTRACT

Composition, useful for curing polyepoxide having a plurality of 1,2-epoxy groups comprising an admixture of:
A. a latent amine curing agent for a polyepoxide having a plurality of 1,2-epoxy groups, and
B. an accelerator for (A), the accelerator having the formula

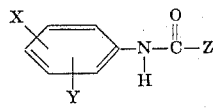

wherein
X = Cl, Br, $CH_3$, $NO_2$, H, or $OCH_3$
Y = Cl, Br, $CH_3$, $NO_2$, H, or $OCH_3$
X and Y can be the same as each other or different from each other,
Z = a monovalent radical derived from a secondary amine having at least three carbon atoms,
provided that when X and Y are selected from the group consisting of Cl, Br, $CH_3$, $NO_2$, or $—OCH_3$ or when X = Br and Y = H, then Z can be a monovalent radical derived from a secondary amine having at least two carbon atoms,
the accelerator being present in an amount of about 0.1–300 percent by weight based on the weight of the latent amine curing agent.

11 Claims, No Drawings

IMPROVED CURING COMPOSITIONS FOR EPOXY RESINS COMPRISING LATENT AMINE CURING AGENT AND ACCELERATOR

BACKGROUND OF THE INVENTION

This invention relates to a composition comprising a blend of (a) a latent amine curing agent for a polyepoxide and (b) an accelerator for the latent amine curing agent.

Polyepoxides that are cured by a curing agent that must be admixed with the polyepoxide immediately before use have certain disadvantages. Often on-site mixing of the polyepoxide and curing agent by workers can cause error. Furthermore, this mixing often requires the use of expensive mixing equipment.

However, polyepoxides incorporating a latent curing agent (that is, one that is not reactive at ordinary room temperatures but will cause crosslinking of the polyepoxide at elevated temperatures) have been less than entirely satisfactory also. For example, often the latent curing agents require a very high temperature of about 325–350°F. to cause crosslinking and often a fairly long time is required to cause the crosslinking to occur. Furthermore, sometimes unsatisfactory curing results in thin films and sometimes the blend of polyepoxide and curing agent has a short shelf life at room temperatures.

SUMMARY OF THE INVENTION

According to the present invention, there is provided:

A composition comprising an admixture of

A. a latent amine curing agent for a polyepoxide having a plurality of 1,2-epoxy groups, and B. an accelerator for (A), the accelerator having the formula

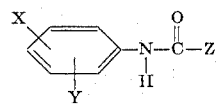

wherein
X = Cl Br, CH$_3$, NO$_2$, H, or OCH$_3$
Y = Cl Br, CH$_3$, NO$_2$, H, or OCH$_3$
X and Y can be the same as each other or different from each other,
Z = a monovalent radical derived from a secondary amine having at least 3 carbon atoms,
provided that when X and Y are selected from the group consisting of Cl Br, CH$_3$, NO$_2$, or —OCH$_3$ or when X = Br and Y = H, then Z can be a monovalent radical derived from a secondary amine having at least two carbon atoms,
the accelerator being present in an amount of about 0.1–300% by weight based on the weight of the latent amine curing agent.

There is also provided by this invention an admixture of the above component (A) and component (B), with (C) polyepoxide having a plurality of 1,2-epoxy groups, and the cured composition that results therefrom.

It has been found that the compositions of this invention that are a blend of component (A) and component (B), in the above amounts, when admixed with polyepoxide, have excellent stability at room temperatures, and provide a relatively rapid cure at temperatures lower than about 325–350°C. and often in the order of about 200–250°F. Furthermore, many of the foregoing blends will cure thin films.

DESCRIPTION OF THE INVENTION

Latent Amine Curing Agent

The latent amine curing agent for the polyepoxide having a plurality of 1,2-epoxy groups is an amine, amine derivative or substituted amine that has such a low nucleophilicity that it is substantially non-reactive with epoxy groups at room temperature but will react with epoxy groups at elevated temperatures. Often such latent amine curing agent will be substantially reactive at temperatures of about 325–350°F. or higher to cause hardening of the polyepoxide within about 1–3 hours.

Suitable latent amine curing agents include:

| Compound | Formula |
|---|---|
| Dicyandiamide | H$_2$N—C—N—CN<br>‖<br>NH |
| Thioameline | H$_2$N—C(=N)—N=C(—SH)—N=C(—NH$_2$)— (triazine ring) |
| Sodium phenylcyanamide | Na—N(—C$_6$H$_5$)—CN |
| Dithiobiuret | H$_2$N—C(=S)—NH—C(=S)—NH$_2$ |
| Ethylenethiourea | H$_2$C—CH$_2$<br>\|    \|<br>HN—C—NH<br>‖<br>S |

| Compound | Formula |
|---|---|
| Diallylmelamine | $CH_2=CHCH_2-N-CH_2CH=CH_2$ on triazine ring with $H_2N-$ and $-NH_2$ substituents |
| Acetoguanamine | Triazine with $H_3C-$, $-NH_2$, and $-NH_2$ substituents |
| Melamine | Triazine with three $-NH_2$ groups |
| Guanylurea | $H_2N-\overset{H}{\underset{\underset{O}{\|}}{C}}-N-\overset{}{\underset{\underset{NH}{\|}}{C}}-NH_2$ |
| Benzoguanamine | Phenyl-substituted triazine with two $-NH_2$ groups |
| Benzoyldicyandiamide | $\phi-\overset{O}{\underset{}{C}}-\overset{H}{N}-\overset{}{\underset{\underset{NH}{\|}}{C}}-\overset{H}{N}-CN$ |
| Guanazole | Triazole ring with two $-NH_2$ groups: $H_2N-C\cdots C-NH_2$ |
| 3-amino-1,2,4 triazole | Triazole with $H-C$ and $C-NH_2$ |
| Monomethyloldicyandiamide | $HOCH_2-\overset{H}{N}-\overset{}{\underset{\underset{NH}{\|}}{C}}-\overset{H}{N}-CN$ |
| Thiosemicarbazide | $H_2N-\overset{H}{N}-\overset{}{\underset{\underset{S}{\|}}{C}}-NH_2$ |
| Adipamide | $H_2N\overset{O}{\underset{}{C}}-CH_2-CH_2-CH_2-CH_2-\overset{O}{\underset{}{C}}NH_2$ |
| Adipyl dihydrazide | $H_2N-\overset{H}{N}-\overset{O}{\underset{}{C}}-CH_2-CH_2-CH_2-CH_2-\overset{O}{\underset{}{C}}-\overset{H}{N}-NH_2$ |
| Isophthalyl diamide | Benzene ring with two $-C(=O)-NH_2$ groups (meta) |
| Isophthalyl dihydrazide | Benzene ring with two $-C(=O)-NH-NH_2$ groups (meta) |

| Compound | Formula |
|---|---|
| Triaminomelamine | (triazine with three NH-NH₂ groups) |
| Tetraminoditolylmethane | (bis-tolyl methane with four NH₂ and two CH₃) |
| Diaminoacridine | (acridine with two NH₂ groups) |
| N-methylglucamine | HOCH₂-(CHOH)₄-CH₂-NH-CH₃ |
| Phenylbiguanide | C₆H₅-NH-C(=NH)-NH-C(=NH)-NH₂ |
| Semicarbazide | H₂N-NH-C(=O)-NH₂ |
| 2-oxoimidazoline-4,5-dicarboxamide | (imidazoline ring with two CONH₂ groups and C=O) |
| Oxaldiimidic acid dihydrazid | H₂N-N=C(NH₂)-C(NH₂)=N-NH₂ |
| Oxamidedioxime | HO-N=C(NH₂)-C(NH₂)=N-OH |
| Diaminomaleonitrile | NC-C(NH₂)=C(NH₂)-CN |
| 2,3-diamino-5,6-dicyanopyrazine | (pyrazine with two NH₂ and two CN groups) |

Stearic hydrazide
Succinimide
Cyanoacetamide

The foregoing list is only suggestive; any latent amine curing agent can be used that meets the previously described general requirements.

Accelerator

The accelerator for the latent amine curing agent has the formula

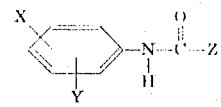

wherein
X = Cl Br, CH₃, NO₂, or H
Y = Cl Br, CH₃, NO₂ or H
X and Y can be the same as each other or different from each other, and Z = a monovalent radical derived from a secondary amine having at least 3 carbon atoms, provided that when X and Y are selected from the group consisting of Cl Br, CH₃, NO₂, or —OCH₃ or when X = Br and Y = H, then Z can be a monovalent radical derived from a secondary amine having at least two carbon atoms.

The Z radical for example can be:

R₁ = C₁—C₆ alkyl or benzyl,
R₂ = C₁—C₆ alkyl or benzyl,
R₁ and R₂ can be the same as each other or different from each other, or

n = 2–7, and
A = —CH₂— or —O—. atoms.
Specific Z radicals include:

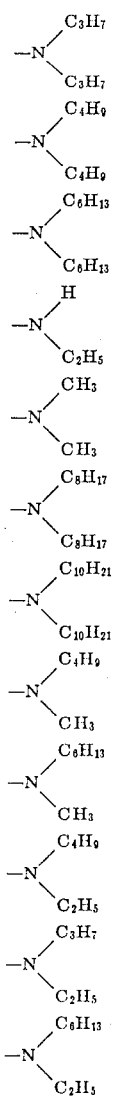

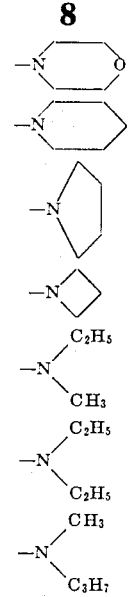

Ordinarily the Z radical will contain no more than about 20 carbon atoms.

Preferred accelerators include the following:

(1) 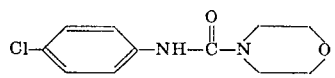

(2) 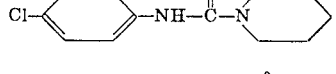

(3) 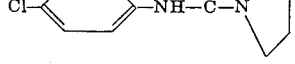

(4) 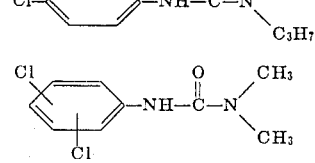

(5) 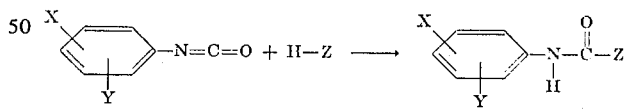

The accelerators can be made by admixing an isocyanate with a secondary amine. The reaction can be represented by

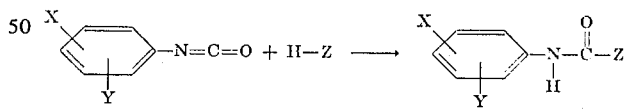

wherein X, Y and Z have been defined previously.

Ordinarily the reaction will take place at room temperature, although slight heating can be used. Ordinarily, stoichiometric quantities of the reactants will be used.

POLYEPOXIDES

The polyepoxides that can be cured using my novel compositions comprise organic materials having a plurality of reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

A widely used class of polyepoxides which can be catalyzed according to the practice of the present invention encompasses the resinous epoxy polyethers obtained by reacting an epihalohydrin, such as epichlorohydrin, epibromohydrin, epiiodihydrin, and the like, with either a polyhydric phenol or a polyhydric alcohol.

Among the polyhydric phenols which can be used in preparing these resinous epoxy polyethers are dihydric phenols represented by the general formula:

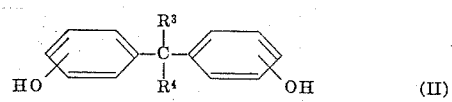 (II)

wherein the phenolic hydroxy groups may be in one of the 2,2'; 2,3'; 2,4'; 3,3'; 3,4'; or 4,4' positions on the aromatic nuclei, and each of $R^3$ and $R^4$ represent hydrogen, an alkyl group, such as methyl, ethyl, propyl, isopropyl, butyl, sec-butyl, tert.-butyl, pentyl, isopentyl, hexyl, isohexyl, and the like; a cyclo (lower)-alkyl group, such as a cyclohexyl or substituted cyclohexyl group, e.g., methyl-, ethyl-, propyl-, butyl-, pentyl- and hexyl-substituted cyclohexyl, or an aromatic group, such as phenyl, tolyl; xylyl, and the like. In addition, the phenolic rings may have other substituents besides the hydroxyl group, for example, lower alkyl groups containing from one to four carbon atoms, i.e., methyl, ethyl, propyl, isopropyl, butyl, secbutyl and tert.-butyl groups, halogen atoms, i.e., fluorine, chlorine, bromine or iodine, and the like.

An illustrative but, by no means exhaustive listing of dihydric phenols falling within this general formula includes 4,4'-dihydroxydiphenyldimethylmethane (bisphenol A), 2,4' -dihydroxydiphenylethylmethane, 3,3' -dihydroxydiphenyl-diethylmethane, 3,4' -dihydroxydiphenylmethylpropylmethane, 2,3' -dihydroxydiphenylethylphenylmethane, 4,4' -dihydroxy-diphenylpropylphenylmethane, 4,4' -dihydroxydiphenylbutylphenylmethane, 2,2' -dihydroxydiphenylditolylmethane, 4,4' -dihydroxydiphenyltolylmethylmethane, and the like.

Other polyhydric phenols which may also be co-reacted with an epihalohydrin to provide these resinous epoxy polyethers are such compounds as resorcinol, hydroquinone, substituted hydroquinones, e.g., p-tert.-butylhydroquinone, and the like, indanols such as those disclosed in U. S. Pat. No. 2,754,285 to Petropoulos, and polyhydric phenols having two hydroxyl aryl groups separated by an aliphatic chain of at least six carbon atoms in length, said chain being attached by carbon-to-carbon bonding to nuclear carbon atoms of the hydroxylaryl groups. Members of this latter class of polyhydric phenols can be conveniently obtained by condensing phenol substituted with an aliphatic side chain having one or more olefinic double bonds positioned therein, thus providing the required number of separating atoms between the two hydroxyphenyl groups of the resulting polyhydric phenol. Cardanol, obtainable in known manner from cashew nut shell liquid, is a convenient source of phenos containing such side chains.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl) dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2'2', 3,3'-tetrahydroxydipropyl sulfide and the like, mercapto alcohols such as α-monothioglycerol, α, α'-dithioglycerol, and the like, polyhydric alcohol partial esters such as monostearin, pentaerythritol monoacetate and the like, and halogenated polyhydric alcohols such as the monochlorodrins of glycerol, sorbitol, pentaerythritol and the like.

When preparing these resinous epoxy polyethers from an epihalohydrin and a polyhydric phenol, the reaction will preferably be carried out in the presence of an amount of an alkaline material, e.g., sodium hydroxide or potassium hydroxide, sufficient to combine with the halogen released by the epihalohydrin during the course of the reaction. The amount of epihalohydrin used is generally in excess of the stoichiometric quantity required for reaction with the epihalohydrin. In addition, the reaction will preferably be carried out at a temperature ranging from about 50° C. to about 150° C., usually for periods of time ranging up to several hours.

When reacting in epihalohydrin with a polyhydric alcohol, the reaction is preferably carried out in the presence of an acid-acting material, e.g., hydrofluoric acid or a boron trifluoride-ether complex, and the resulting halohydrin product is then dehydrohalogenated in the presence of an alkaline material.

The resulting resinous reaction products may contain free terminal hydroxyl groups or terminal hydroxyl groups and terminal epoxy groups, and will vary in molecular weight depending on the reactants employed, the relative amounts thereof, and the extent to which the reaction is carried out. These thermosetting epoxy resinous materials are generally soluble in solvents such as acetone, methyl ethyl ketone, methyl isobutyl ketone, cyclohexanone, and the like.

A related class of polymeric polyepoxides which can be catalyzed according to the practice of the present invention comprises the polyepoxypolyhydroxy polyethers obtained by reacting, again preferably in alkaline medium a polyhydric phenol such as bisphenol A, resorcinol, catechol and the like, or a polyhydric alcohol such as glycerol, sorbitol, pentaerythritol and the like, with a polyepoxide such as bis(2,3-epoxypropyl)ether, bis(2,3-epoxy - 2 - methylpropyl)-ether, 1,2-epoxy -4,5-epoxypentane and the like.

Another class of polymeric polyepoxides which can be cured by means of the above-described curing agents includes the epoxy novolac resins obtained by reacting, preferably, in the presence of a basic catalyst, e.g., sodium or potassium hydroxide, and epihalohydrin such as epichlorohydrin with the resinous condensate of an aldehyde, e.g., formaldehyde, and either a monohydric phenol, e.g., phenol itself, or a polyhydric phenol, e.g, bisphenol A. A representative number of the epoxy novolac resins obtained by reacting an epihalohydrin with a monohydric phenol-formaldehyde resinous condensate can be represented by the general formula:

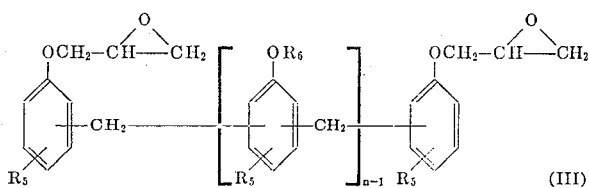

wherein, for example, $R^5$ represents either hydrogen or a lower alkyl group, such as methyl, ethyl, and the like, $R^6$ represents hydrogen, a halohydrin group, e.g.,

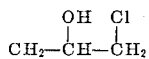

a glycol group, e.g.,

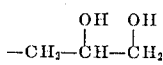

or a glycidyl group, i.e.,

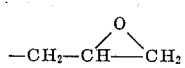

and $n$ is a number of 1 or greater. Similarly, a representative number of the epoxy novolac resins obtained by reacting an epihalohydrin with a polyhydric phenol-formaldehyde resinous condensate can be represented by the general formula:

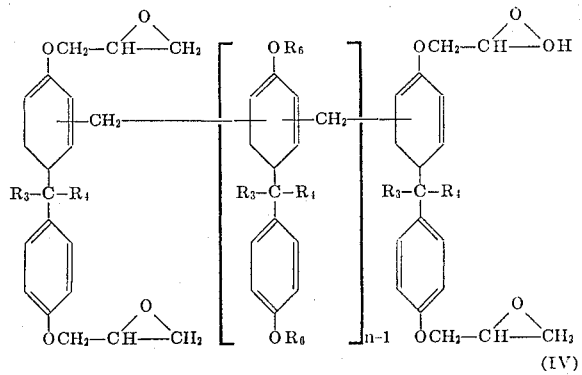

wherein $R_3$ and $R_4$ are as defined for Formula II above and $R^6$ and $n$ are as defined for Formula III above. Further details concerning the nature and preparation of these epoxy novolac resins can be obtained in Carswell, T.S., "Phenoplasts" (New York: Interscience Publishers, 1947) page 29 et seq.

Still another class of polymeric polyepoxides which can be catalyzed with the above-described curing agents includes polymers, i.e., homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst but, in the absence of alkaline or acidic catalysts, leaving the epoxy groups unaffected and, therefore, regularly or randomly dispersed along the polymer chains. Among such ethylenically unsaturated epoxy-containing monomers are vinyl 2,3-glycidyl ether, allyl 2,3-glycidyl ether, methallyl 2,3-glycidyl ether, methallyl 3,4-epoxybutyl ether, glycidyl acrylate, glycidyl methacrylate, 2,3-epoxypropyl crotonate, vinyl cyclohexane monoxide, 4-glycidyloxystyrene, and the like. Suitable comonomers for copolymerization with these ethylenically unsaturated epoxy-containing monomers include styrene, acrylonitrile, methacrylonitrile, methyl acrylate, ethyl acrylate, methyl methacrylate, vinyl chloride, vinylidene chloride, vinyl acetate, diallyl phthalate, and the like.

Among the monomeric polyepoxides which can be catalyzed according to the practice of the present invention are the di- and triepoxides represented by the general formula:

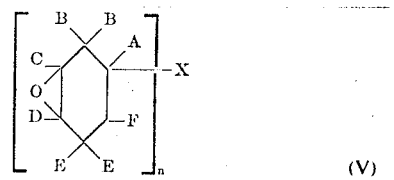

wherein A through F represent hydrogen or an alkyl group, preferably a lower alkyl group having from one to four carbon atoms, inclusive, such as methyl, ethyl, propyl, n-butyl and the like, and X represents a divalent radical which can be:

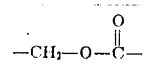

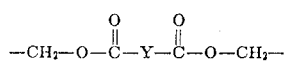

or

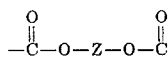

in which case n equals 2, or a trivalent radical which can be

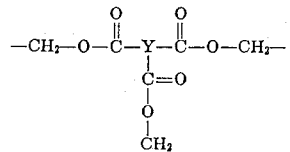

or

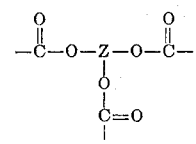

in which case n equals 3, with Y representating an aliphatic or aromatic hydrocarbon radical containing from two to 12 carbon atoms, inclusive, and Z representing a lower aliphatic hydrocarbon radical or a lower oxyalkylene group, e.g., -alkylene-0-alkylene- and the like. Included among such di- and triepoxides are 3,4-epoxycyclohexylmethyl 3,4-epoxy-cyclohexane-carboxylate, 3,4-epoxy-6-methylcyclohexymethyl 3,4 - epoxy-6-methyl cyclohexanecarboxylate, bis(3,4- epoxycyclohexylmethyl)maleate, bis(3,4 - epoxy-6-methylcyclohexylmethyl)-succinate, ethylene glycol bis(3,4 - epoxycyclohexanecarboxylate), 2-ethyl-1,3-hexanediol bis(3,4 - epoxy-6-methylcyclohexanecarboxylate), tris(3,4 - epoxycyclohexylmethyl)1,2,4-hexanetricarboxylate, glyceryl tris(3,4-epoxy-6-methylcyclohexanecarboxylate) and the like.

Other monomeric polyepoxides which can be cured by means of the above-described substituted curing agents include dicyclopentadiene dioxide, epoxidized triglycerides such as epoxidized glycerol trioleate, epoxidized glycerol trilinoleate, the diacetate of epoxidized glycerol trilinoleate and the like, 1,8-bis-(2,3-epoxypropoxy)octane, 1,4 - bis(2,3 - epoxypropoxy) cyclohexane, 1,4 - bis(3,4-epoxybutoxy) - 2 - chlorocyclohexane, 1,3-bis(2,3-epoxypropoxy)benzene, 1,4 - bis(2,3 - epoxypropoxy) benzene, 1,3-bis(2-hydroxy-3,4-epoxybutoxy)benzene, 1,4-bis(2-hydroxy-4,5-epoxypentoxy) benzene, 1, 3 - bis(4,5-epoxypentoxy)-5-chlorobenzene, 4,4'-bis(2,3 - epoxypropoxy) diphenyl ether, and epoxy ethers of polybasic acids such as diglycidyl succinate, diglycidyl adipate, diglycidyl maleate, digycidyl phthalate, diglycidyl hexachloroendomethylenetetrahydrophthalate and diglycidyl 4,4' - isopropylidenedibenzoate, and the like.

Many of these polyepoxides, and particularly those which are polymeric, can be conveniently referred to in terms of epoxy equivalency, i.e., the average number of epoxy groups per molecule in the polyepoxide material. Where the polyepoxide is monomeric and all of its epoxy groups are intact, its epoxy equivalency will be represented by an integer, usually 2 or greater. However, where the polyepoxide is polymeric its epoxy equivalency will usually be represented by a fractional value of at least about 1.0 or greater, e.g., 1.5, 1.8, 2.3, and the like, since the polymer will usually contain molecules of different molecular weight and can also contain some monomeric polyepoxide or have some of its epoxy groups dehydrated or otherwise reacted.

It will be appreciated by those skilled in the art that the catalyzed polyepoxide-containing compositions which can be prepared according to the practice of the present invention are not limited to those containing the above-described polyepoxides, but that said polyepoxides are to be considered merely as being representative of the class of polyepoxides as a whole. Further details concerning the nature and preparation of the above-described polyoxides can be found in U.S. Pat. Nos. 2,633,548; 2,872,427 and 2,884,408, among others, which are incorporated herein by reference.

Additives

Various conventionally employed additives can be admixed with these novel low temperature catalyzed polyepoxide-containing compositions prior to final cure. For example, in certain instances, it may be desired to add minor amounts of co-catalysts or hardeners along with our novel curing agents. Conventional pigments, dyes, fillers, flame-retarding agents and other compatible natural and synthetic resins can also be added. Furthermore, known solvents for the polyepoxide materials, such as acetone, methyl ethyl ketone, toluence, benzene, xylene, dioxane, methyl isobutyl ketone, dimethylformamide, Cellosolve acetate and the like can be used if desired and where necessary.

If desired, the blend of components (A) latent amine curing agent for polyepoxide, (B) accelerator for latent amine curing agent, and (C) polyepoxide can contain (D) suitable filler. Often the filler will be present in an amount of about 0.5–60%, preferably 0.5–50% and most preferably about 10–30% by weight filler (the foregoing percentages being by weight based on the combined weight of the filler and the polyepoxide.

Suitable filler materials include particles of titanium dioxide, calcium carbonate, barium titanate, potassium titanate, magnesium sulfate, asbestos, mica, Bentonite clays, $Fe_3O_4$, $Fe_2O_3$, aluminum, alumina, expanded volcanic ash, silica, thermoplastic and cured epoxy resin. One may also use microballoons, i.e., small hollow spheres of glass, silica or ceramic. As examples of silica there may be mentioned "Ludox" colloidal silica, "Cab-O-Sil" colloidal silica, "Celite" diatomaceous silica, "Aerosil" blend of fumed silica and aluminum oxide, and "Hi-sil" silica (a hydrated silica). One may also use fly ash which is a product of coal combustion. Suitable thermoplastics include particles of expanded Saran, nylon, polyethylene, acrylonitrile butadiene copolymers and the like.

Ratio of Reactants

Enough accelerator should be present to cause the latent amine curing agent to cure the polyepoxide at the temperature and for the time desired. Often the accelerator will be present in the following percents by weight based on the weight of the latent amine curing agent, 0.1–300%, preferably 0.5–200%, more preferably 20–150% and most preferably about 40–120%. More than the above amounts of accelerator can be used but at the present time it is believed that no additional benefits will be obtained.

An effective amount of the latent amine curing agent should be used to cure the polyepoxide. Often this effective amount will be the stoichiometric ratio of the amine groups in the latent amine curing agent to epoxy groups in the polyepoxide. However, sometimes the stoichiometric ratio must be modified based on experimental results. Often there will be used about 0.5–20 parts by weight latent amine curing agent per 100 parts by weight polyepoxide.

Process

The compositions of this invention are made by admixing the previously described components. If it is desired to make a curing composition that can later be admixed with a polyepoxide, components (A) and (B) can be admixed. If it is desired to make a polyepoxide composition including the curing agent, components (A), (B), (C) and if desired (D) can be admixed.

Since sometimes the latent amine may be somewhat difficult to disperse, a preferred method is to disperse the latent amine in the polyepoxide (such as by use of a 3-roll mill) and then mix into the latent amine/polyepoxide blend, the accelerator and if desired, filler.

Any suitable mixing means can be used such as a 3-roll mill, ball milling, sand grinding, stirring, high shear mixing, and the like.

Utility

The admixture of polyepoxide, latent amine curing agent for the polyepoxide and the accelerator can be used in any of the applications for which polyepoxides are customarily used, e.g., as adhesives, impregnants, surface coatings, potting and encapsulating compositions, in laminates, in fillers, powder coatings and particularly, as adhesives for bonding metallic elements or structures together, etc.

The following examples illustrate the invention. All parts and percentages are by weight unless otherwise specified.

EXAMPLE 1

0.8 Part dicyandiamine latent amine curing agent was admixed with 10 parts "XD-3599" polyepoxide a urethane modified diepoxide of bisphenol A having an epoxy equivalent weight of about 225-250 (available from Dow Chemical Company) by use of a three roll mill so that the dicyandiamide had particle size of about 0.5 mil.

Then 0.5 parts of N-(N'-p-chlorophenyl carbamoyl) piperidine accelerator having the formula

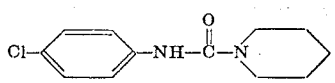

was admixed with the above described polyepoxide/dicyandiamide blend with a high speed stirrer.

The resulting admixture was hard after curing for 90 minutes at 250°F.

EXAMPLE 2

Example 1 was repeated with the exception that the accelerator of Example 1 was replaced with 0.7 part N-(N'-p-chlorophenyl carbamoyl) morpholine accelerator having the formula

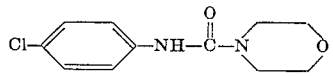

The admixture was hard after curing for 120 minutes at 250°F.

EXAMPLE 3

Example 1 was repeated with the exception that the accelerator of Example 1 was replaced with 0.5 part of N-(N'-p-chlorophenyl carbamoyl) dipropylamine accelerator having the formula

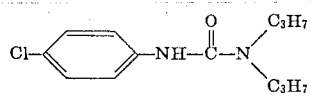

The resulting composition was hard after curing for 150 minutes at 250°F.

EXAMPLE 4

Example 1 was repeated with the exception that the accelerator of Example 1 was replaced with 0.5 part N-(N'-p-chlorophenylcarbamoyl) pyrrolidine accelerator having the formula

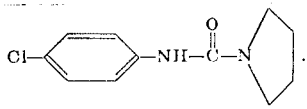

The resulting composition was hard after curing for 60 minutes at 250°F.

A portion of the composition that had been drawn down with a knife to a thickness of about 1-2 mils prior to curing also cured to a hard mass.

EXAMPLE 5

Example 1 was repeated with the exception that the latent amine curing agent of Example 1 was replaced with 1.0 part benzoguanamine. The resulting composition was hard after curing for 4 hours at 250°F.

EXAMPLE 6

Example 1 was repeated with the exception that the accelerator of Example 1 was replaced with 0.24 part of 3-(3,4-dichlorophenyl)-1,1-dimethylurea accelerator having the formula

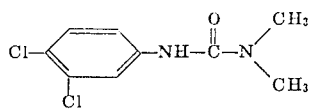

The admixture was hard after curing for 120 minutes at 250°F.

The invention claimed is:

1. Composition comprising an admixture of:
   A. an effective amount of a latent amine curing agent for (C) polyepoxide, such curing agent being substantially free of Lewis acid-Lewis base complexes,
   B. an accelerator for (A), the accelerator having the formula

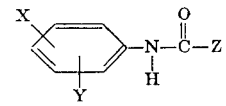

wherein
   X = Cl Br, $CH_3$, $NO_2$, H, or $OCH_3$
   Y = Cl Br, $CH_3$, $NO_2$, H, or $OCH_3$
   X and Y can be the same as each other or different from each other,
   Z = a monovalent radical derived from a secondary amine having at least three carbon atoms,
   the accelerator being present in an amount of about 0.1–300% by weight based on the weight of the latent amine curing agent, and
   C. polyepoxide having a plurality of 1,2-epoxy groups.

2. The composition of claim 1 wherein the latent amine curing agent is present in an amount of about 0.5–20 parts per weight per 100 parts per weight of polyepoxide.

3. The composition of claim 1 wherein the polyepoxide is the reaction product of or an epihalohydrin and a polyhydric phenol, a polyhydric alcohol and the latent amine curing agent is selected from the group consisting of the following:
   Dicyandiamide Thioameline
Sodium Phenylcyanamide
Dithiobiuret
Ethylenethiourea
Diallylmelamine
Acetoguanamine
Melamine
Guanylurea
Benzoguanamine
Benzoyldicyandiamide
Guanazole
3-Amino-1,2,4-triazole
Monomethyloldicyandiamide
Thiosemicarbazide
Adipamide
Adipyl dihydrazide
Isophthalyl diamide
Isophthalyl dihydrazide
Triaminomelamine   Tetraminoditolymethane
Diaminoacridine
N-Methylglucamine
Phenylbiguanide
Semicarbazide
2-Oxoimidazoline-4,5-dicarboxamide
Oxaldiimidic acid dihydrazid
Oxamidedioxime
Diaminomaleonitrile
2,3-Diamino-5,6-dicyanopyrazine
Stearic hydrazide
Succinimide
Cyanoacetamide .

4. The composition of claim 2 wherein the polyepoxide is the reaction product of an epihalohydrin and a polyhydric phenol, or a polyhydric alcohol and the latent amine curing agent is selected from the group consisting of the following:
Dicyandiamide
Thioameline
Sodium Phenylcyanamide
Dithiobiuret
Ethylenethiourea
Diallylmelamine
Acetoguanamine
Melamine
Guanylurea
Benzoguanamine
Benzoyldicyandiamide
Guanazole
3-Amino-1,2,4-triazole
Monomethyloldicyandiamide
Thiosemicarbazide
Adipamide
Adipyl dihydrazide
Isophthalyl diamide
Isophthalyl dihydrazide
Triaminomelamine
Tetraminoditolymethane
Diaminoacridine
N-Methylglucamine
Phenylbiguanide
Semicarbazide
2-Oxoimidazoline-4,5-dicarboxamide
Oxaldiimidic acid dihydrazid
Oxamidedioxime
Diaminomaleonitrile
2,3-diamino-5,6-dicyanopyrazine
Stearic hydrazide
Succinimide
Cyanoacetamide .

5. The composition of claim 1 wherein the accelerator is selected from the group consisting of (1) 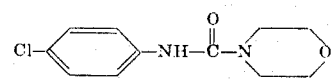

(2) 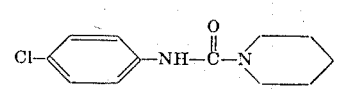

(3) 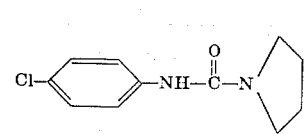

(4) 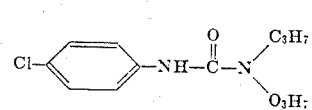

6. The composition of claim 2 wherein the accelerator is selected from the group consisting of (1) 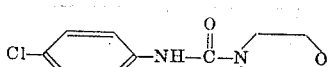

(2) 

(3) 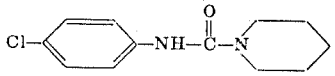

(4) 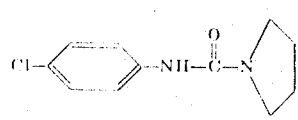

7. The composition of claim 4 wherein the accelerator is selected from the group consisting of (1) 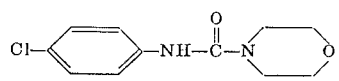

(2) 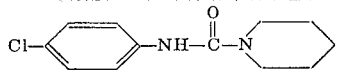

(3) 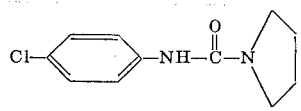

(4) 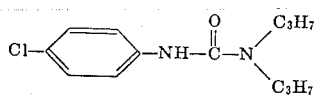

8. The composition of claim 1 wherein the accelerators have the formula set forth in (B) of claim 1 wherein Z is

n = 2–7
A = —CH$_2$— or —O—
provided that $n$ and A are selected so that the carbon ring attached to the nitrogen atom in the above formula always has at least 3 carbon atoms.

9. The composition of claim 1 containing about 0.5–60% by weight of filler based on the weight of the polepoxide.

10. The composition of claim 4 containing about 0.5–60% by weight of filler based on the weight of the polyepoxide.

11. The cured composition of claim 1 formed by heating the composition of claim 1 at a temperature and for a time sufficient to form a hard mass.

* * * * *

UNITED STATES PATENT OFFICE
CERTIFICATE OF CORRECTION

Patent No. 3,759,914    Dated September 18, 1973

Inventor(s) John A. Simms and Henry S. Tremper, III.

It is certified that error appears in the above-identified patent and that said Letters Patent are hereby corrected as shown below:

Column 16, line 64, delete "of or an" and insert -- of an --.

Column 16, line 65, insert -- or -- before "a polyhydric alcohol".

Signed and sealed this 1st day of January 1974.

(SEAL)
Attest:

EDWARD M. FLETCHER, JR.
Attesting Office

RENE D. TEGTMEYER
Acting Commissioner of Patents